US005682853A

United States Patent [19]
Hull et al.

[11] Patent Number: 5,682,853
[45] Date of Patent: Nov. 4, 1997

[54] COMBINATION PISTON AND ROD

[76] Inventors: Harold L. Hull, 401 Canyon Way #43; Cathy D. Santa Cruz, 451 Canyon Way #72, both of Sparks, Nev. 89434

[21] Appl. No.: 714,643

[22] Filed: Sep. 16, 1996

Related U.S. Application Data

[60] Provisional application No. 60/003,807, Sep. 15, 1995.
[51] Int. Cl.⁶ .................................................. F02B 75/32
[52] U.S. Cl. .................................................. 123/197.3
[58] Field of Search ........................... 123/197.1, 197.2, 123/197.3

[56] References Cited

U.S. PATENT DOCUMENTS

| Re. 16,344 | 5/1926 | Powell | 123/197.3 |
| 1,566,486 | 12/1925 | Lee | 123/197.1 |
| 2,164,612 | 7/1939 | Harrington | 123/197.3 |
| 2,853,989 | 9/1958 | Teegen | 123/197.2 |
| 4,463,710 | 8/1984 | McWhorter | 123/48 B |
| 4,567,866 | 2/1986 | Schubert | 123/197 R |
| 4,890,588 | 1/1990 | Tillman | 123/78 E |
| 5,133,314 | 7/1992 | Langstroth | 123/197.1 |
| 5,156,121 | 10/1992 | Routery | 123/197.3 |
| 5,239,958 | 8/1993 | Booher | 123/197.2 |
| 5,351,566 | 10/1994 | Barnett | 123/197.1 |
| 5,528,946 | 6/1996 | Yadegar | 123/197.1 |

FOREIGN PATENT DOCUMENTS 4040443  7/1992  Germany ................. 123/197.2

Primary Examiner—David A. Okonsky

[57] ABSTRACT

The present invention relates to a unique piston and rod assembly which easily replaces an existing prior art piston and rod assembly, as found within any typical internal combustion engine. The present invention teaches a unique design which incorporates therein, a rack and pinion as the means to moveably attach the top end of the rod to the piston with a slider mechanism to keep the rack and pinion in close tolerance with each other. The horizontal travel of the crank shaft and the rod journal cause a rocking motion at the junction of the rod and piston, which causes the piston to rise and fall after top-dead-center (T.D.C.), and after bottom-dead-center (B.D.C.), thus producing numerous advantages, including less emissions, less fuel consumption, greater power, greater torque, etc.

3 Claims, 3 Drawing Sheets

COMBINATION PISTON AND ROD

It is to be noted that this application was filed by the same inventors as a "Provisional application", Ser. No. 60/003,807, filed on Sep. 15, 1995 which is now considered to be abandoned.

FIELD OF THE INVENTION

This invention relates in general to machines and engines that use the four body linkage mechanism to generate power or to do useful work, and in particular, to devices that modify the movement of the four body linkage (piston, connecting rod, crankshaft and cylinder/crankcase block) used to generate and transfer power in the internal combustion engine.

BACKGROUND OF THE INVENTION

It is widely known that, at maximum pressure and temperature, the combustion process that occurs in the typical internal combustion engine is incomplete. The maximum thermal efficiency varies from 45–50% at peak output levels and often averages only 25% for a normal driving cycle. This includes both spark-ignition and compression-ignition engines. Basically, there are only two ways to improve engine efficiency; alter the fuel/air mixture, or alter the geometry of the linkage that is used to generate and transfer the work created during the combustion phase. You can force more fuel and air into the cylinder chamber using a turbo or supercharger and increase power, but the efficiency still remains low. Some improvements have been made using cleaner single compound fuels, like propane or alcohol, or by altering the mixture (carburetors), or fuel flow patterns (valves, cams, etc.), but the total improvements made by all these fuel/air changes have only increased engine efficiency by several percent in the past sixty or more years. The introduction of higher compression ratio engines is one major geometrical improvement that has occurred in this time span.

The poor thermal utilization of the internal combustion engine occurs primarily as a result of the geometry of the combustion chamber. The chamber shape is a cylinder with flattened ends. One end (head) is stationary and the other (piston) is free to move up and down. Minor variations have been tried on the shape of the end faces with only minimal success.

We contend that the moving piston is the major cause of the low efficiency obtained in the internal combustion engine. A large part of the engine inefficiency occurs because the piston is moving down, at an accelerating rate, as the fuel is combusted. The combustion chamber is being enlarged by the rotating linkage at the same time that the combustion force is being generated.

The time increment available to create a force that will sustain itself on the dropping piston and increase its momentum is very small. The crankarm angle increases (5) degrees every 200 micro-seconds (0.0002) at a rated speed of 4166 rpm. Ignition is typically initiated in spark-ignition engines at (20–35) degrees before top dead center (T.D.C.) and at rated speed and peak cylinder pressures occur between (5–15) degrees after T.D.C., which means a (25–40) degree crankarm arc is traversed from the start of ignition to peak pressure levels in 0.0010–0.0016 seconds at 4166 rpm. Diesel characteristics are different than the above numbers, but they also require small time increments.

Because it occurs in an expanding chamber after T.D.C. is passed, the maximum pressure possible is reduced as the piston drops. The combustion force cannot sustain itself long enough on the piston to overcome the pressure drop created by the expanding chamber volume as the piston falls. Chamber volume percentage changes increase as the compression ratio goes up. When the combustion force contacts the piston, it causes the piston to accelerate downward at a faster rate than that generated by the momentum of the moving parts. The net effects of the rapidly expanding chamber also tends to create disruptive, vacuum type, flows in the pressure waves that are created.

If a mechanism can be installed to retard the piston from moving downward, thus slowing the velocity of its decent, over a crankarm rotation large enough to allow more combustion to occur in a chamber whose volume has been expanded by a minimal amount (less than the four body linkage), higher cylinder pressures will be achieved, along with better fuel combustion. More time and a smaller chamber will exist to generate a larger force acting on the piston. Torque output will increase.

It is to be noted that throughout the lengthy life of the internal combustion engine, many inventors have tried to improve at least some of the disadvantages of its design, however, each attempt has heretofore proven to be only a moderate improvement, (if at all) and furthermore each would prove to be much to costly and complex to manufacture.

The following references are exemplary of the above noted attempts to achieve improved performance from the typical internal combustion engine;

U.S. Pat. No. 5,239,958, issued to Booher, entitled "DELAY STROKE PISTON AND ROD FOR ENGINE". This reference substantially provides an improved delay stroke piston assembly for reciprocating piston engines. This is an interesting attempt which may provide some improvement regarding intake and exhaust efficiency, but this reference as taught is still highly inefficient and does not address, and/or include the objects and advantages of the present invention.

A further attempt is exemplified in U.S. Pat. No. 5,156,121, issued to Routery, entitled "PISTON-CONNECTING ROD ASSEMBLY". This reference substantially attempts to increase the compression period, resulting in a constant volume burn, and further causing the initial expansion not to occur until the crank is well past T.D.C. This reference proves to be most interesting in theory, but again, only moderate improvement and/or advantage is achieved, unlike that of the present invention which addresses and overcomes substantially all of the known disadvantages of the internal combustion engine, and/or that of the known prior art, in a manner heretofore not seen nor taught.

Still further attempts to improve the piston, rod and/or crankarm of the internal combustion engine are exemplified herein only as related prior art, as follows; U.S. Pat. Nos. 4,890,588, 4,567,866, 4,463,710 and 3,908,623. Each of which have inherent disadvantages which the present invention addresses and overcomes.

SUMMARY OF THE INVENTION

It is contended by the applicants that a great need exists for an efficient internal combustion engine which overcomes the known disadvantages of the prior art and includes an improved piston and rod assembly, which heretofore has not been seen nor taught.

It is therefore a primary object of the present invention to provide in combination, a piston and rod assembly which replaces the typical rod and piston assembly as found in a typical internal combustion engine, or any other four linkage system.

It is a most important object of the present invention to provide in combination, a piston and rod assembly which is of a shape and size to be easily, removably inserted within an existing internal combustion engine, or any other four linkage system, without making any alterations and/or adjustments thereto, other than adjusting the timing, whereby further providing an ideal theoretical performance curve.

It is still a further object of the present invention to provide increased compression ratio.

Yet another object of the present invention is to provide a piston and rod assembly which reduces and/or eliminates the exhaust emissions (such as hydrocarbons and carbon monoxide) from an existing internal combustion engine.

Also another object of the present invention is to provide a piston and rod assembly which reduces and/or eliminates the need for a catalytic converter on the engine.

Another object of the present invention is to provide a piston and rod assembly which reduces and/or eliminates nitrogen oxides emitted from the working engine.

Still another important object is to provide a piston and rod assembly which reduces the exhaust temperature when emitted from the working engine.

Yet another object of the present invention is to provide means to lengthen the piston stroke.

A very important object of the present invention is to delay the piston stroke when at top dead center (T.D.C.) and when at bottom dead center (B.D.C.).

Still a further object of the present invention is to slow the acceleration of the piston during the power stroke below the acceleration of the crank journal.

Another important object of the present invention is to change the geometry of the relationship between the piston and the crank shaft.

Yet a further object of the present invention is to change the acceleration and deceleration rates into various unsymmetrical increments in a more efficient manner.

Still another object of the present invention is to provide a piston and rod assembly which reduces engine vibration.

A most important object of the present invention is to provide a piston and rod assembly which when installed within an internal combustion engine greatly reduces the engines fuel consumption.

Another object of the present invention is to provide a piston and rod assembly which when installed within the typical internal combustion engine, reduces disruptive, vacuum type flows in the pressure waves that are created.

Yet another object of the present invention is to provide a piston and rod assembly which when installed within an internal combustion engine, reduces and/or eliminates the need for fuel additives.

Still a further object of the present invention is to provide a piston and rod assembly which when installed within an internal combustion engine, increases the mean effective pressure (M.E.P.).

Also a further object of the present invention is to provide a piston and rod assembly which when installed within an internal combustion engine, increases substantially the engine torque.

Still a further object of the present invention is to provide a piston and rod assembly which when installed within an internal combustion engine, substantially increases the combustion time.

Yet another object of the present invention is to provide a piston and rod assembly which when installed within an internal combustion engine, substantially eliminates pre-ignition.

Another object of the present invention is to provide a piston and rod assembly which when installed within an internal combustion engine, provides the results normally attained from the use of a super-charger, therefore, the need for a super-charger is eliminated.

Still a further object of the present invention is to provide a piston and rod assembly which when installed within an internal combustion engine, provides continuous volume combustion.

Yet another important object of the present invention is to provide a piston and rod assembly which when installed within an internal combustion engine, eliminates the need for a wrist-pin.

Also a very important object is to provide a piston and rod assembly which when installed within an internal combustion engine, provides improved overall performance and/or efficiency of said engine.

A most important object of the present invention is to provide a piston and rod assembly which when installed within an internal combustion engine, provides an improved, efficient, economical, environmentally friendly engine.

Other objects and advantages will be seen when taken into consideration with the following drawings and specification;

DETAILED DESCRIPTION OF THE DRAWINGS

Figure 1:
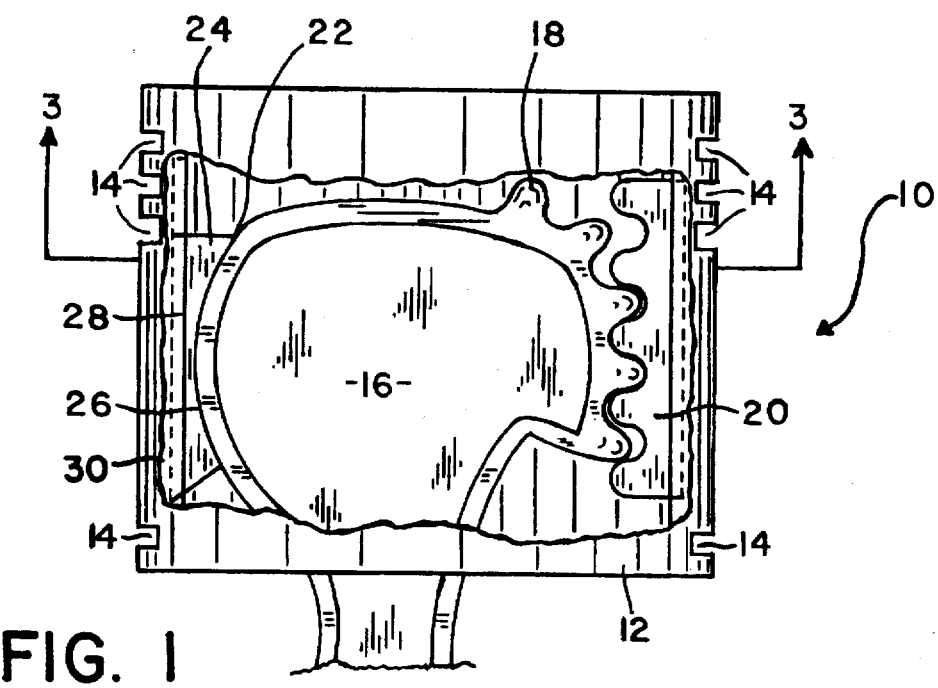
FIG. 1 is substantially a cut-a-way view of the preferred embodiment of the upper end of the piston and rod assembly of the present invention.
Figure 2:
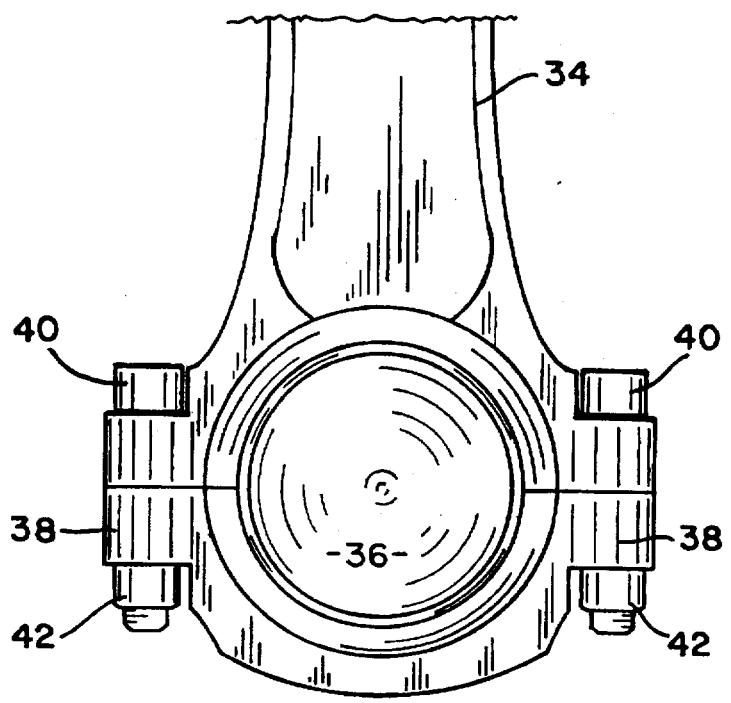
FIG. 2 is a side view of the lower half of the present piston and rod assembly.
Figure 4:
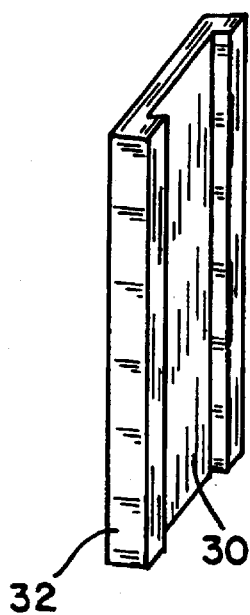
FIG. 4 is a perspective view of a guide for the slider of FIG. 5.
Figure 5:
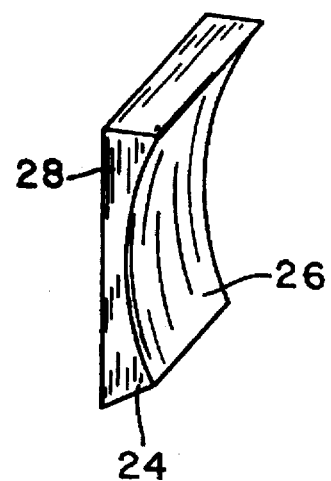
FIG. 5 is a perspective view of a slider.
Figure 3:
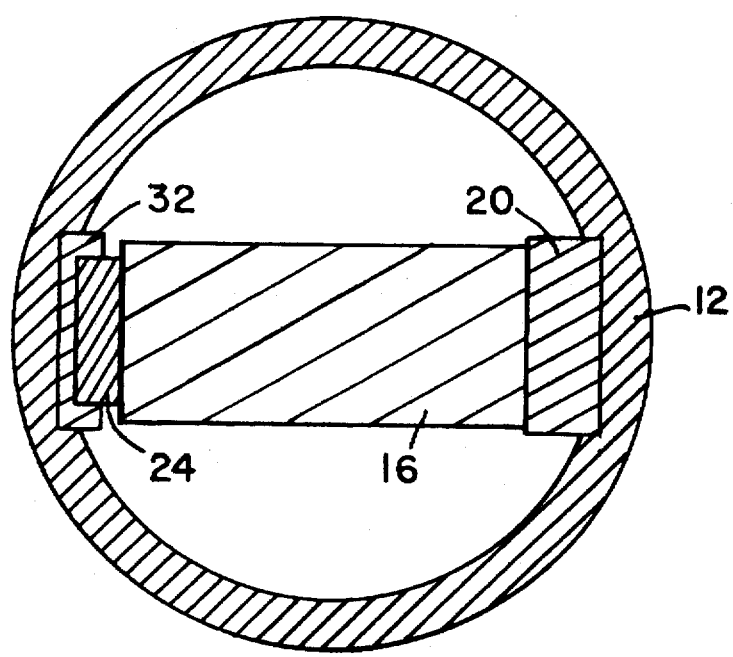
FIG. 3 is a sectional view taken at 3—3 of FIG. 1.

Referring now in detail to the drawings, wherein like characters refer to like elements throughout the various views, as shown in FIG. 1, numeral 10 represents a partial cut-a-way view of the present invention which is substantially, a piston and rod assembly in combination, with 12 being a piston having an outside vertical circumference surface and an inside vertical circumference surface, with the outside vertical circumference surface having multiple piston ring grooves 14 which are horizontally located at a position of engineering choice. The inside circumference surface having a vertical toothed rack 20 and a vertical raceway 30 which are substantially opposed to each other and which may be integrally formed within piston 12, if so desired.

A slider 24 having a straight side 28 and a curved side 26, with the straight side 28 being of a shape and size to easily slide within the vertical raceway 30.

Rod 34 having a first end and a second end, with the first end being journaled to a typical crankshaft 36 in the usual manner by rod-cap 38, bolts 40, and nuts 42, with the second end having an integrally formed pinion gear 18 which is of a shape and size to mesh with rack 20 and the second end having substantially an integrally formed curved section 22 which is of a shape and size to mate with the curved side 26 of slider 24.

It is to be noted that rack 20 and raceway 30 are preferably integrally formed within the piston at the point of manufacture, but if so desired these elements may be produced separately and attached to the piston at a location of engineering choice.

It is to be further noted that the piston and rod combination as described above may be installed at the point of manufacture within substantially any engine of choice, or the piston and rod may be produced as an after market product and installed within a pre-existing engine of choice after the pre-existing piston and rod have been removed therefrom.

MODE OF OPERATION

Figure 7:
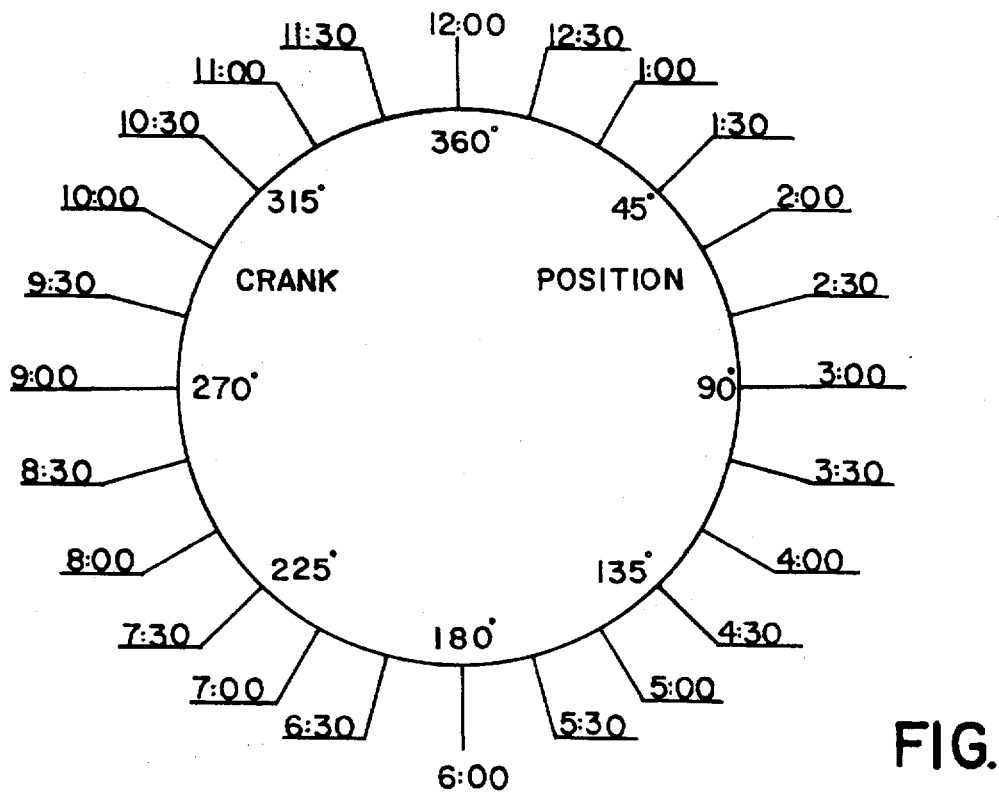
FIG. 7 is a graph showing the position of degrees of a typical crankshaft.

In FIG. 7, we show the degrees of travel of a typical crankshaft at the center of the point of junction of the rod journaled to the crankshaft and also for clarification we have marked the travel as the hours of a clock, with 12:00 being top-dead-center (T.D.C.) and 6:00 bottom-dead-center (B.D.C.), etc. As the crankshaft journal travels from its 9:00 o'clock position to its 3:00 o'clock it causes a rocking motion of the top end of the rod 16 which is anchored to the piston 12 by the rack and pinion section 18 & 20, which is held in a close tolerance relationship with the piston 12 by the slider 24, thus, the rocking motion causes the piston 12 to continue to rise after top-dead-center of the crank shaft 36 and the piston 12 to continue to fall after bottom-dead-center of the crank shaft 36.

Figure 6:
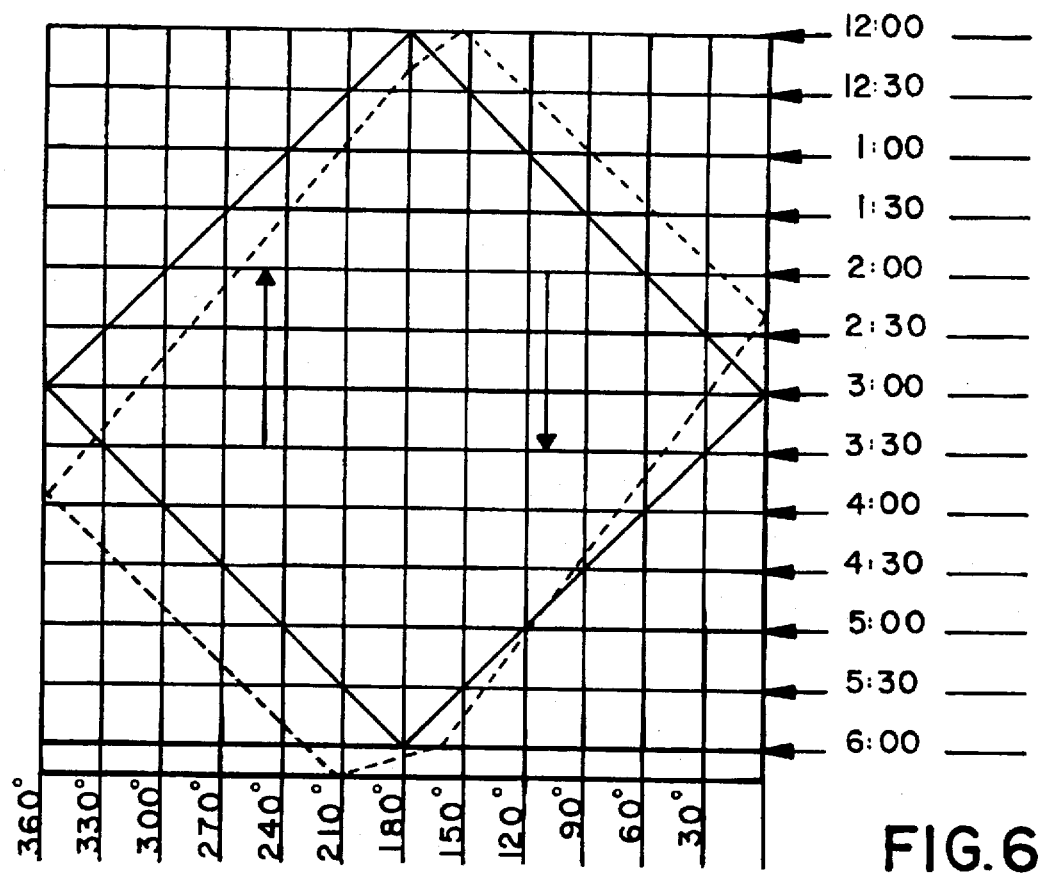
FIG. 6 is a graph showing the variation of position with time of the pistons of a conventional piston and of the piston in accordance with the present invention.

Referring now to FIG. 6, we show the typical path of a standard prior art piston in relationship to a standard prior art crankshaft by the solid lines 44, while the broken lines 46 show the path of the piston of the present invention.

It will now be seen that the piston stroke of the present invention has been lengthened by 3-5 percent over the prior art piston stroke and that the maximum height of the piston travel of the present invention occurs after top-dead-center (T.D.C.). In actual practice, the inventors have achieved as much as a 20 degree delay after top-dead-center (T.D.C.) of the crankshaft before the piston starts down and as much as 38 degrees delay after bottom-dead-center (B.D.C.) of the crankshaft before the new piston starts upward.

The advantages of the combination rod and piston of the present invention over the prior art of record are many and include substantially longer burn time, higher compression, elimination of pre-ignition, reduction of fuel consumption, reduction of exhaust emissions, reduced exhaust temperatures, less harmonic vibration, longer piston stroke, slower piston speeds during the power stroke, early torque, greater torque, less requirement for high octane fuels, reduction of disruptive vacuum type flows in the pressure waves, a higher means effective pressure (M.E.P.), continuous volume combustion, eliminates the wrist-pin, and may be used to replace virtually any piston and rod combination within any internal combustion engine so as to meet today's rigid emission requirements.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

We claim:

1. A piston and rod combination comprising; said piston having an outside vertical circumference surface and an inside vertical circumference surface, said outside vertical circumference surface having multiple ring grooves horizontally located at a position of engineering choice, said inside circumference surface having a vertical toothed rack and a vertical raceway with said rack and said raceway being substantially opposed to each other, a slider having a straight side and a curved side, said straight side being of a shape and size to easily slide within said vertical raceway, said rod having a first end and a second end, said first end being journaled to a crankshaft, said second end having an integrally formed pinion gear which is of a shape and size to mesh with said rack, and said second end having substantially an integrally formed curved section which is of a shape and size to mate with said curved side of said slider.

2. The piston and rod combination of claim 1 wherein said rack and said raceway are each integrally formed within said piston.

3. A piston and rod combination comprising; said piston having an internal rack and an internal slider, said rod having a first end which is attached to a crank shaft and a second end which is of a shape and size to slidably mate and be removably retained between said rack and said slider, said second end having an integrally formed pinion gear engaging said rack, said gear being formed as an arc such that the travel of said crank shaft and said rod cause said piston to continue to rise after top-dead-center of said crank shaft and said piston to continue to fall after bottom-dead-center of said crank shaft.

* * * * *